(12) United States Patent
Ohnishi et al.

(10) Patent No.: US 6,554,405 B1
(45) Date of Patent: Apr. 29, 2003

(54) LIQUID-DROP DISCHARGE DEVICE HAVING CONTROLLED PRESSURE DIFFERENTIAL BETWEEN LIQUID STORAGE TANK AND REACTION CELL

(75) Inventors: Takao Ohnishi, Aichi-ken (JP); Toshikazu Hirota, Kuwana (JP); Yukihisa Takeuchi, Aichi-ken (JP)

(73) Assignee: NGK Insulators, Ltd., Nagoya (JP)

( * ) Notice: Subject to any disclaimer, the term of this patent is extended or adjusted under 35 U.S.C. 154(b) by 196 days.

(21) Appl. No.: 09/669,933

(22) Filed: Sep. 26, 2000

(30) Foreign Application Priority Data

Sep. 28, 1999 (JP) .............................. 11-275044

(51) Int. Cl.$^7$ .............................. B41J 2/045; B41J 3/00
(52) U.S. Cl. .............................. 347/68; 347/2
(58) Field of Search .................... 347/68, 2, 29

(56) References Cited

U.S. PATENT DOCUMENTS

| | | |
|---|---|---|
| 4,443,807 A | 4/1984 | Koto |
| 5,502,467 A | 3/1996 | Hoisington et al. |
| 5,992,978 A * | 11/1999 | Fujii et al. .................... 347/54 |
| 6,299,288 B1 * | 10/2001 | Abeywardane et al. ....... 347/47 |

FOREIGN PATENT DOCUMENTS

| | | |
|---|---|---|
| EP | 0 322 131 | 6/1989 |
| EP | 0 411 802 A2 | 2/1991 |
| EP | 0 623 472 A2 | 11/1994 |
| WO | 95/12109 | 5/1995 |

OTHER PUBLICATIONS

Patent Abstracts of Japan. vol. 004, No. 049 (M–007) Apr. 15, 1980 & JP 55 017571 A (Seiko Epson Corp, others), Feb. 7, 1980 *abstract*.

* cited by examiner

Primary Examiner—Judy Nguyen
(74) Attorney, Agent, or Firm—Burr & Brown

(57) ABSTRACT

A liquid-drop discharge device includes an array of liquid-drop discharge units for discharging liquid from a float cell in communication with a liquid storage tank. A reaction cell, into which fluid is discharged, is provided in communication with the float cell. A differential adjusting tube is provided between the float cell and the reaction cell and includes a release valve for maintaining a specified pressure relationship between an internal pressure P2 of the float cell and an internal pressure P3 of the reaction cell. A driving circuit is provided to drive a pressurizing source of the liquid-drop discharge device and is connected to a control unit. The control unit is connected to a pressure sensor, which detects the internal pressure of the reaction cell and the release valve. The internal pressure P1 of the liquid storage tank is controlled to be larger than the internal pressure P3 of the reaction cell.

16 Claims, 3 Drawing Sheets though such a description is not included in the above-discussed reference. When using the above-discussed conventional device for performing printing on sheets of paper, the ink-drops may be landed on desired locations of paper sheets through relative movements of the head and paper sheets at a condition in which specified amounts of driving voltage is applied to the piezoelectric/electrostrictive elements that correspond to desired pixels.

LIQUID-DROP DISCHARGE DEVICE HAVING CONTROLLED PRESSURE DIFFERENTIAL BETWEEN LIQUID STORAGE TANK AND REACTION CELL

BACKGROUND OF THE INVENTION

1. Field of the Invention

The present invention relates to a liquid-drop discharge device used in various machineries for processing liquid by performing discharge of the liquid, and more particularly to liquid drop discharge devices performing spraying operations in an operating environment in which the internal pressure of a reaction cell is lower than the internal pressure of a liquid storage tank or a liquid reservoir.

2. Description of the Prior Art

Ink jet discharge devices as disclosed, for instance, in Japanese Patent Unexamined Publication No. 6-40030 (1994) are conventionally known types of devices for discharging liquid in the form of minute particles used in particular fields. However, such discharge devices are used in offices or schools under relatively stationary conditions with little fluctuations in the temperature or pressure of peripheral environments when being used, and are not exposed to significant fluctuations in operating environments.

On the other hand, minute powder forms of various chemicals are being used as auxiliary products in the manufacturing of semiconductors or the like, wherein required standards in view of particle size can not be achieved by simply using mechanical crushing means. It would, therefore, be desirable to develop new manufacturing methods for new types of chemical powders. In one exemplary method for supplying raw materials in the form of minute particles to substrates in reaction cells, it is a strict requirement to supply the chemical powder particles into drying chambers in a stable manner. It is thus highly desirable to develop devices that may be used with such methods for discharging liquid as particles ranging from several hundreds of nanometers to several tens of microns in a stable and controlled manner. Fluctuations in operating conditions produce remarkable variations in the environments of discharge spaces, and it is presently the case that no device has yet been proposed with which supply liquid can be discharged as minute particles in a desirable manner in the presence of these variations in discharge space environments.

SUMMARY OF THE INVENTION

The present invention has been made with the aim of providing a liquid discharge device for discharging raw materials or the like. The liquid discharge device being arranged to continuously adjust a condition for discharging liquid to be an optimal condition even when environmental conditions of peripheral environments fluctuate or vary, and for stably discharging liquid even though the operating environment may be one in which the discharge space is prone to abrupt and accidental fluctuations in operating conditions.

For solving the above problems in the prior art, the inventors have devised a liquid-drop discharge device made up of a plurality of liquid-drop discharge units each of which include a liquid discharge nozzle for discharging liquid supplied from a liquid storage tank, a pressurizing chamber for pressuring liquid to be discharged through the nozzle, an introducing hole for supplying liquid to the pressurizing chamber from the storage tank, and a piezoelectric/electrostrictive element for causing pressurizing operations. The liquid-drop discharge device further includes a liquid discharge means in which respective liquid introducing holes of adjoining liquid-drop discharge units are connected to a common liquid supply path, and a reaction cell provided having a space into which the nozzles face for discharging liquid from the discharge units. An internal pressure of the liquid storage tank (P1) and an internal pressure of the reaction cell (P3) have the following relationship: P1>P3. With this arrangement, since the internal pressure of the reaction cell (P3) is a negative pressure with respect to the liquid storage tank (P1), drops of discharge liquid can be effectively discharged through the liquid introducing holes of the adjoining liquid-drop discharge units owing to the driving force of the positive pressure of the pressurizing chamber to thereby enable sufficient spraying of large amounts of liquid.

It should be noted that for the purpose of appropriately performing spraying operations in situations where the internal pressure of a reaction cell is lower than the internal pressure of a liquid storage tank, or that of a liquid reservoir, a known method exists wherein spraying is not directly performed from a spraying outlet of a liquid storage chamber to the reaction cell but wherein a separate pressurizing chamber is provided between the spraying outlet and the reaction cell for adjusting the internal pressure of the pressurizing chamber to be equal to that of the internal pressure of the liquid storage chamber, and then performing spraying operations from the spraying outlet to the reaction cell through the pressurizing chamber. This method, however, does not provide a liquid discharge device capable of spraying large amounts of discharge liquid.

Another aspect of the invention relates to a liquid-drop discharge device which includes a liquid storage tank, a liquid reservoir having a specified capacity that is connected to the liquid storage tank by means of a check valve, a liquid discharge means for discharging liquid from the liquid reservoir, and a reaction cell provided to have a space into which liquid is discharged from the liquid discharge means. The liquid discharge means includes a plurality of adjoining liquid-drop discharge units respectively connected to a liquid supply path communicating with the liquid reservoir. Each of the liquid-drop discharge units includes a liquid discharge nozzle facing the reaction cell to discharge liquid from the discharge units, a pressurizing chamber for pressurizing liquid to be discharged through the nozzle into the reaction cell, an introducing hole for supplying liquid from the liquid supply path to the pressurizing chamber, and a piezoelectric/electrostrictive element for causing pressurizing operations. A differential regulating tube is provided between the liquid reservoir and the reaction cell to connect the reservoir and reaction cell to one another, and maintains a specified relationship between an internal pressure of the liquid reservoir and an internal pressure of the reaction cell. The differential regulating tube is controlled such that the above-discussed internal pressures satisfy the following relationship: $P1 \geq P2 \geq P3$; wherein P1, P2 and P3 respectively represent an internal pressure of the liquid storage tank, the internal pressure of the liquid reservoir, and the internal pressure of the reaction cell. With this arrangement, it is possible to prevent backflow of fluid from the reaction cell to the liquid reservoir or from the liquid reservoir to the liquid storage tank.

Preferably, a float reservoir is employed in the liquid reservoir and functions to maintain a liquid surface level constant for preventing backflow of liquid to the liquid storage tank. The float reservoir also maintains a pressure at which liquid is supplied to the liquid-drop units to be constant. It is further desirable to set the internal pressure P1 of the liquid storage tank to be at an atmospheric pressure for enabling successive supply of liquid from the storage tank.

It is further desirable to control the pressure differential existing between internal pressure P2 of the liquid reservoir and the internal pressure P3 of the reaction cell to be a constant pressure differential. With this constant pressure differential arrangement, it is possible to avoid cases in which adjustments of spraying amounts cannot be performed because the pressure differential is too large, which causes leakage of liquid when utilizing the pressure differential for spraying large amounts of liquid. The above-discussed arrangement is further favorable in view of stabilizing the spraying amount.

Preferably, the internal pressure P2 of the liquid reservoir is maintained to be at a specified pressure value or to exceed the specified pressure value by using a regulating valve provided on the differential regulating tube. Alternatively, the regulating value can be provided in the liquid reservoir. With this arrangement, the regulating valve may be controlled to perform the spraying of large amounts of liquid while maintaining the internal pressure P2 of the liquid reservoir in a negative pressure condition, which thereby prevents air bubbles from adhering to inner walls of the liquid reservoir or other members of the discharge device from expanding. Control of the regulating value is performed to satisfy the following relationships: atmospheric pressure≧P2≧specified pressure value≧P3.

A favorably used regulating valve may be, for instance, a leak valve arranged in such a manner that a valve body pressurizes a valve seat to close the valve body through the use of an urging member and to release the valve body from the valve seat against urging forces of the urging member when the internal pressure of the reaction cell is in a specified negative pressure condition. The regulating valve could also be a solenoid valve in which releasing and closing operations are controlled at timings based on values of the internal pressure of the reaction cell, as detected by a detector or a regulator or the like.

The regulating valve is connected to a control unit, which inputs instructions for closing or releasing the valve in accordance with control signals for driving or terminating the liquid discharge means.

When the regulating valve is mounted to the differential adjusting tube, it is possible to employ a means for outputting a control signal for closing a release valve which the control unit had released for the purpose of setting the internal pressure P3 of the reaction cell and the internal pressure P2 of the liquid reservoir to be substantially equal to increase the amount of discharged liquid-drops from the liquid discharge means. A control signal could also be output to drive the liquid discharge means at the moment P3>P2 is satisfied. A control means could output a control signal to close the release valve and to drive the liquid discharge means after a specified delay in view of response of the regulating valve or response of pressure. A precise control means could be employed for first outputting a control signal for closing the release valve that is in a released condition and then outputting a control signal for driving the liquid discharge means from the control unit upon detection of a negative pressure condition within the reaction cell by using a pressure sensor.

On the other hand, when the regulating valve is mounted to the liquid reservoir, it is possible to favorably employ a control means for outputting control signals for releasing a leak valve that had been closed by the control unit for setting the internal pressure P3 of the reaction cell and the internal pressure P2 of the liquid reservoir to be substantially equal and driving the liquid discharge means either the moment P3>P2 is satisfied or at a somewhat delayed timing by a specified time in view of response of the regulating valve or pressure. A control means is also preferably used to output control signals for driving the liquid discharge means in accordance with signals from the pressure sensor provided within the reaction cell.

DETAILED DESCRIPTION OF THE INVENTION

Embodiments of the liquid-drop discharge device according to the present invention will now be explained in detail.

Figure 1:
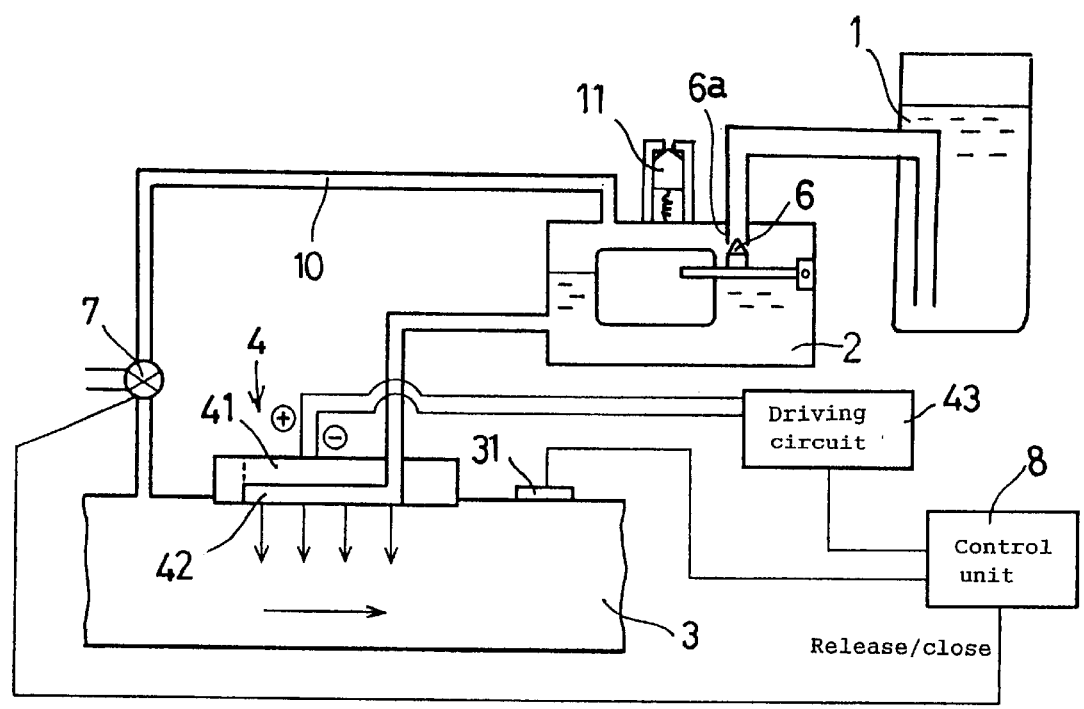
FIG. 1 is an explanatory view of a liquid-drop discharge device in accordance with the present invention.

FIG. 1 is a schematic view of a liquid-drop discharge device which includes a float cell 2 provided with a valve 6 in communication with a liquid storage tank 1. The liquid-drop discharge device includes a liquid discharge means 4 for discharging liquid from the float cell 2, a reaction cell 3 into which fluid is discharged from liquid discharge means 4, and a differential adjusting tube 10 provided between the float cell 2 and the reaction cell 3. The differential adjusting tube includes a release valve 7, which maintains a specified relationship between an internal pressure P2 of the float cell 2 and an internal pressure P3 of the reaction cell 3. A driving circuit 43 is connected to control unit 8 and drives piezoelectric/electrostrictive element 41 of liquid discharge means 4 to perform pressurizing operations. The control unit 8 is connected to a pressure sensor 31 for detecting the internal pressure in the reaction cell 3 and in the release valve 7 positioned in the differential adjusting tube.

Air is supplied to the reaction cell 3 in a direction indicated by the arrows shown in FIG. 1, and the internal pressure of reaction cell 3 is detected by the pressure sensor 31 mounted on a wall surface thereof. The liquid discharge means 4 is similarly mounted on a surface wall portion of reaction cell 3 and is formed to have a plurality of discharge holes on an inner surface including diameters of several nanometers to several tens of microns. A pressurizing chamber 42 includes a pressurizing source 41 being mounted on an outer surface thereof, and one end of the pressurizing chamber 42 is connected to the float cell 2 through a tubular path. A liquid surface level of the float cell 2 is adjusted using valve 6 and a tube aperture 6a communicating with the liquid storage tank 1. It is preferable to mount a diaphragm on the differential adjusting tube 10 connected at one end of the float cell 2 for preventing backflow of reaction gases from the reaction cell 3.

A process of manufacturing ceramic powder with uniform particle distribution using zirconia of a ceramic material as liquid will now be explained. A fluid slurry is formed by mixing the zirconia with a suitable agent. By discharging the slurry into the reaction cell 3, into which hot air is being supplied through the liquid discharge device, binders included in the discharged slurry are cured and dried and cured particles are collected at a final end of the reaction cell 3. By supplying these cured particles to a thermal cracking path, zirconia powder of targeted particle sizes can be obtained.

The control unit 8 controls the amount of liquid sprayed from the liquid-drop discharge device through being connected to the pressurizing source 41, the release and closure of valve 7 in accordance with received electric signals, and the pressure sensor 31 through the driving circuit 43.

Figure 2:
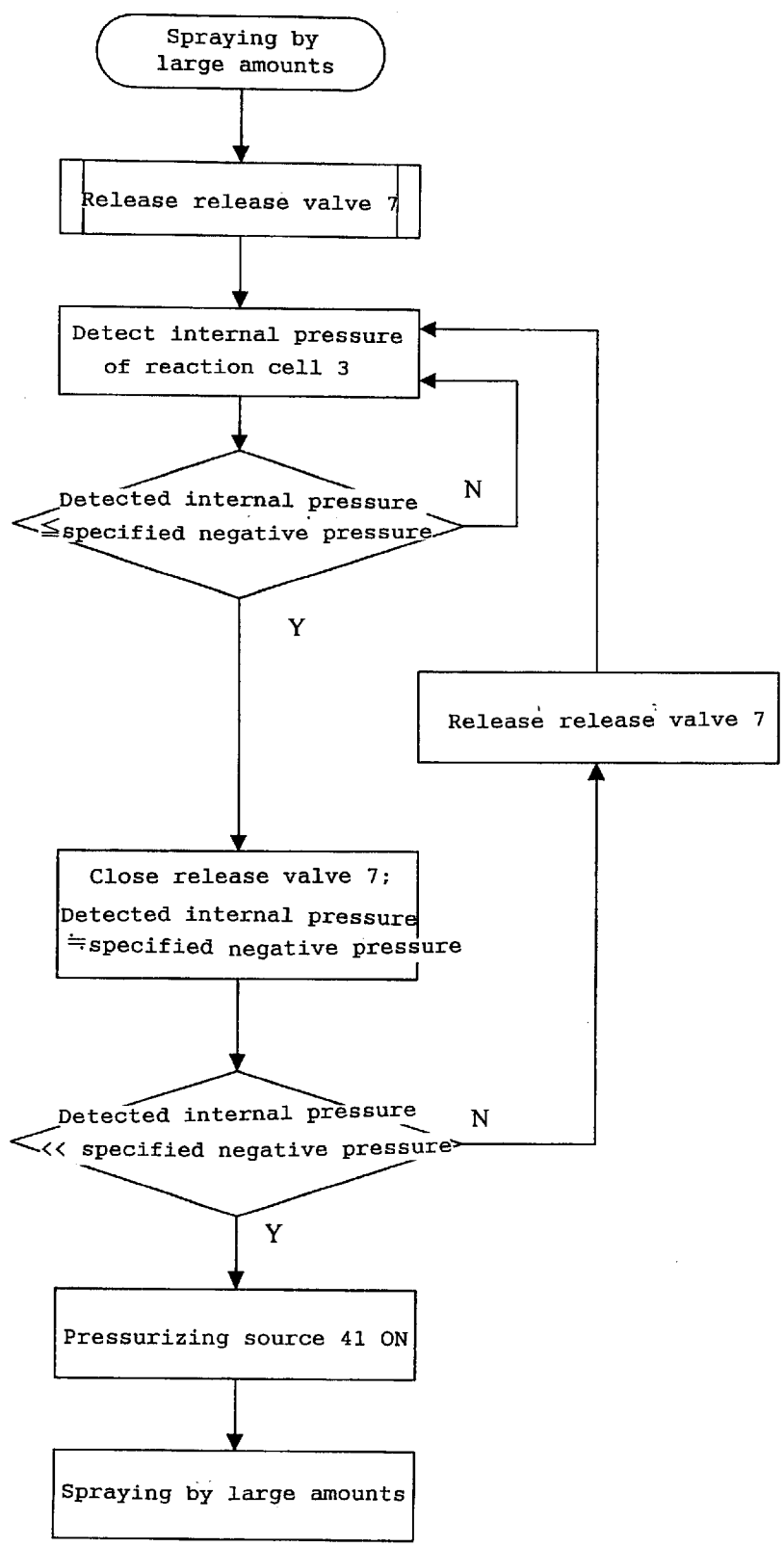
FIG. 2 is an explanatory view showing operations of a control unit in accordance with the present invention.

FIG. 2 is an explanatory view showing operations of the control unit 8 shown in FIG. 1. In the control unit 8, an internal pressure value of the reaction cell 3 is read from the pressure sensor 31, and when a specified pressure (negative pressure) has been reached, the control unit 8 sends instructions for closing the release valve 7 to set the internal pressure of the float cell 2 to be a specified value.

Thereafter, it is confirmed that the internal pressure value of the reaction cell 3 has become a negative pressure from the specified negative pressure condition upon receipt of a signal from the pressure sensor 31, and a signal is output to the driving circuit 43 for switching the pressurizing source 41 ON. Accordingly, the pressurizing chamber 42 of the liquid discharge means 4 is pressurized by the pressurizing source 41 to thereby cause liquid-drops to be discharged through the discharge holes. Since these liquid-drops are jetting out from the discharge holes as if being pulled out by the negative pressure condition of the reaction cell 3, no liquid drains will be caused by being accumulated at the discharge holes but spraying can be performed by reinforcing the discharge force by the negative pressure, and it is thus possible to perform the spraying of large amounts of liquid.

When terminating spraying, the control unit 8 acts to make the driving circuit 43 output a signal for turning the pressurizing source 41 OFF and a release instruction is output to the release valve 7. The timing may be favorably set to provide suitable time differences in view of the response of the regulating valve or the response of the pressure.

On the other hand, in the case that only a small amount of liquid is to be sprayed instead of a large amount, no instruction for closing the release valve 7 is output from the control unit 8, even though an instruction for performing the spraying of a small amount of liquid is output at timing T3 (shown in FIG. 3) from the control unit 8 and the driving circuit 43 outputs a signal for turning the pressurizing source 41 ON. With this arrangement, the release valve 7 is maintained in the released condition and the internal pressure P3 of the reaction cell 3 and the internal pressure P2 of the float cell 2 are in equal pressure conditions, and a small amount of liquid-drops are successively sprayed through the pressurizing force of only the pressurizing source 41.

Figure 3:
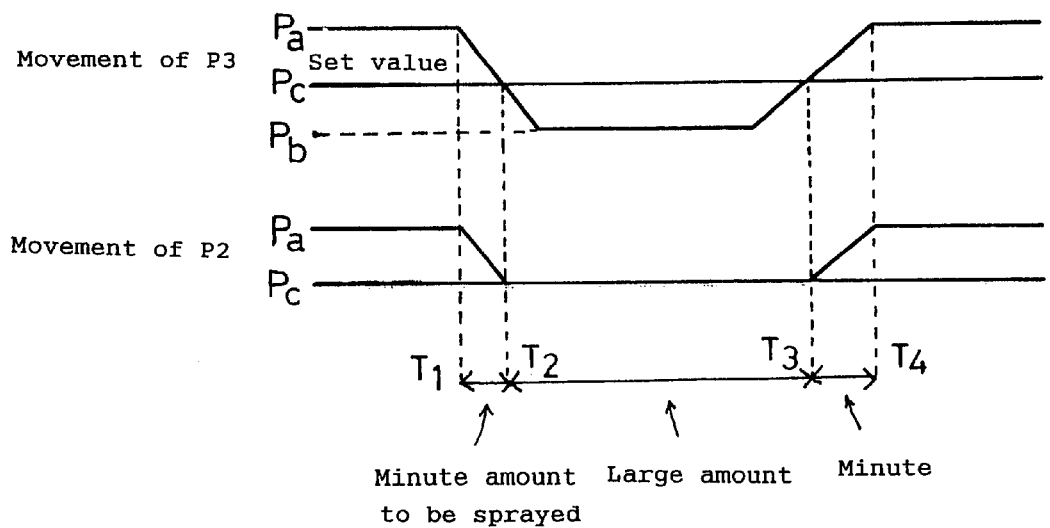
FIG. 3 is an explanatory view showing a pressure relationship between internal pressures P2 and P3 and amount of spraying with a regulator being mounted.

FIG. 3 is an explanatory view for showing another form of embodiment, and is an explanatory view showing operations of a liquid-drop discharge device employing regulators instead of a solenoid valve.

Negative pressure values Pc are preliminarily set for regulators respectively mounted on the differential adjusting tube and the liquid reservoir such that air bubbles remaining in the liquid reservoir or in a pipe connecting the liquid reservoir and the liquid discharge means will not be expanded for decreasing the amount of spraying. In the case that the internal pressure P3 of the reaction cell 3, that is being detected by the sensor, has decreased (timing T1) to be in a specified negative pressure condition Pc (timing T2), the regulators are actuated for maintaining the specified negative pressure condition Pc. In the case that an instruction for increasing the amount of liquid drops to be discharged from the liquid discharge means 4 is simultaneously output, liquid drops discharged from the liquid discharge means 4 are absorbed through negative pressure forces of the reaction cell 3 to thereby enable a spraying condition of a large amount of liquid in a smooth manner. On the other hand, in the case that an instruction is output for setting the amount of liquid drops to be discharged from the liquid discharge means 4 to be a minute amount when the internal pressure P3 of the reaction cell 3 has increased from the specified negative pressure condition to return to be not less than the set value Pc (timing T3), no absorbing force will be present since the internal pressure P2 of the float cell 2 is substantially equal to the internal pressure P3 of the reaction cell 3 so that spraying of minute amounts of liquid can be performed in a smooth manner.

A leak valve II mounted on the float cell 2 is closed with a valve body pressurizing a valve seat by means of an urging member. In the case that the internal pressure of the reaction cell 3 arrives at the specified negative pressure condition, the valve body is pulled in the negative pressure direction against the urging forces so that the valve body is parted from the valve seat for achieving release. In the case that an instruction for increasing the amount of liquid drops to be discharged from the liquid discharge means 4 is output in the meantime, liquid drops discharged from the liquid discharge means 4 are absorbed by negative pressure forces of the reaction cell 3 to thereby perform spraying in a smooth manner. On the other hand, in the case that the internal pressure of the reaction cell 3 is the specified set negative pressure value or more, the valve body is contacting the valve seat through the urging force for closing the valve so that in the case that an instruction is output for setting the amount of liquid drops to be discharged from the liquid discharge means 4 to be a minute amount during this period, no absorbing force owing to the negative pressure will be present since the internal pressure P2 of the float cell 2 is substantially identical to the internal pressure P3 of the reaction cell 3, and spraying by minute amounts of liquid can be performed in a smooth manner.

It should be noted that the shapes, sizes or materials of the respective members shall be determined in view of the purpose of use or physical and chemical characteristics of the liquid to be discharged. The reaction cell 3, for instance, may be made of stainless steel or a member having an inner surface lined by glass or the like in the case that the cell functions as a reaction unit for gaseous reaction. The reaction cell can also be made of stainless steel members in the case that the cell functions as a drying chamber for liquid. The liquid discharge means 4 is favorably formed from ceramic materials in view of chemical resistance and solvent resistance.

It is further possible to mount a safety valve to one end of the float cell 2 for releasing the pressure within the float cell 2 and making the internal pressure of the float cell 2 to be equal to the pressure of the peripheral environment in the case of an emergency such that the liquid-drop discharge device can cope with the occurrence of abnormal conditions in the float cell 2.

As explained so far, since P1>P3 is satisfied when P1 and P3 respectively represent an internal pressure of the liquid storage tank and an internal pressure of the reaction cell, the internal pressure of the reaction cell will be a negative pressure with respect to the liquid storage tank. Accordingly, liquid drops ejected through the discharge holes may be effectively dispersed through the driving forces of the pressurizing chamber reinforced by absorbing forces in the negative pressure space, and thus, it is no longer necessary to provide a plurality of discharge holes or to provide a large-sized pressurizing chamber for filling liquid to perform the spraying of large amounts of liquid. Accordingly, the spraying of large amounts of liquid can be performed while preventing the leakage of fluid when discharging minute amounts of liquid.

Another aspect of the invention relates to a liquid-drop discharge device including a differential regulating tube being provided between the liquid reservoir and the reaction cell to connect these members for maintaining a specified relationship between an internal pressure of the liquid reservoir and an internal pressure of the reaction cell. The differential regulating tube is controlled to satisfy the following relationship: $P1 \geq P2 \geq P3$. P1, P2 and P3 respectively represent an internal pressure of the liquid storage tank, the internal pressure of the liquid reservoir, and the internal pressure of the reaction cell. With this arrangement, in addition to the above-discussed benefits, it is possible to prevent backflow of fluid from the reaction cell to the liquid reservoir or from the liquid reservoir to the liquid storage tank.

Since the liquid reservoir is comprised of a float cell provided with a function of maintaining a liquid surface level constant it is possible to prevent backflow of liquid to the liquid storage tank. By setting the internal pressure P1 of the liquid pressure tank to be equal to the atmospheric pressure, liquid may be successively supplied to the liquid storage tank.

The differential of the internal pressure P2 of the liquid reservoir and the internal pressure P3 of the reaction cell is controlled to be constant. With this arrangement, it is possible to avoid cases in which adjustments of the spraying amounts of liquids cannot be performed when the differential becomes too large to cause leakage of liquid in the case of utilizing this differential for the spraying of large amounts of liquids. In addition, this arrangement is further favorable in view of stabilizing the spraying amount of liquid.

The internal pressure P2 of the liquid reservoir is maintained to be at a specified pressure value or to exceed the specified pressure value by using a regulating valve provided on the differential regulating tube or in the liquid reservoir. With this arrangement, the regulating valve may be controlled for performing the spraying of large amounts of liquids, the internal pressure P2 of the liquid reservoir will be in a negative pressure condition from the specified pressure value to thereby prevent air bubbles adhering to inner walls of the liquid reservoir or other members from expanding, and further to prevent conditions in which liquid drops can not be sprayed since pressurizing force is absorbed by the air bubbles.

The regulating valve is connected to a control unit for inputting closing or releasing instructions in accordance with control signals for driving or terminating the liquid discharge means. It has accordingly been enabled to control the valve body synchronously with the pressurizing source of the liquid discharge means that is operated at high speed and thus to perform the spraying of large amounts.

What is claimed is:

1. A liquid-drop discharge device comprising a liquid storage tank and a liquid reservoir of a specified capacity connected by means of a check valve, liquid discharge means for discharging liquid from the liquid reservoir, and a reaction cell having a space into which liquid is discharged from the liquid discharge means, the liquid discharge means comprising a plurality of adjoining liquid-drop discharge units respectively connected to a liquid supply path communicating with the liquid reservoir, and each liquid-drop discharge unit comprising a liquid discharge nozzle opening into the reaction cell, a pressurizing chamber for pressurizing liquid to be discharged through the nozzle, an introducing hole for supplying liquid from the liquid supply path to the pressurizing chamber, and a piezoelectric/electrostrictive element for pressurizing operations, wherein a differential regulating tube is provided between the liquid reservoir and the reaction cell to maintain a specified relationship between an internal pressure of the liquid reservoir and an internal pressure of the reaction cell, and wherein the differential regulating tube is, controlled to satisfy $P1 \geq P2 \geq P3$, with P1 being an internal pressure of the liquid storage tank, P2 being an internal pressure of the liquid reservoir, and P3 being an internal pressure of the reaction cell.

2. The liquid-drop discharge device of claim 1, wherein the liquid reservoir has a float valve provided to maintain a liquid surface level constant.

3. The liquid-drop discharge device of claim 2, wherein the internal pressure P1 in the liquid storage tank corresponds to atmospheric pressure.

4. The liquid-drop discharge device of claim 2, wherein a differential P2–P3 of the internal pressure P2 in the liquid reservoir and the internal pressure P3 in the reaction cell is maintained to be constant.

5. The liquid-drop discharge device of claim 2, further comprising a regulating valve provided on the differential regulating tube or in the liquid reservoir for maintaining the internal pressure P2 of the liquid reservoir at a specified pressure value or at a value exceeding the specified pressure value.

6. The liquid-drop discharge device of claim 2, further comprising a regulating valve connected to a control unit for inputting closing or releasing instructions in accordance with control signals from the control unit for driving or terminating the liquid discharge means.

7. The liquid-drop discharge device of claim 1, wherein the internal pressure P1 in the liquid storage tank corresponds to atmospheric pressure.

8. The liquid-drop discharge device of claim 7, wherein a differential P2–P3 of the internal pressure P2 in the liquid reservoir and the internal pressure P3 in the reaction cell is maintained to be constant.

9. The liquid-drop discharge device of claim 7, further comprising a regulating valve provided on the differential regulating tube or in the liquid reservoir for maintaining the internal pressure P2 of the liquid reservoir at a specified pressure value or at a value exceeding the specified pressure value.

10. The liquid-drop discharge device of claims 7, further comprising a regulating valve connected to a control unit for inputting closing or releasing instructions in accordance with control signals from the control unit for driving or terminating the liquid discharge means.

11. The liquid-drop discharge device of claim 1, wherein a differential P2–P3 of the internal pressure P2 in the; liquid reservoir and the internal pressure P3 in the reaction cell is maintained to be constant.

12. The liquid-drop discharge device of claim 11, further comprising a regulating valve provided on the differential regulating tube or in the liquid reservoir for maintaining the internal pressure P2 of the liquid reservoir at a specified pressure value or at a value exceeding the specified pressure value.

13. The liquid-drop discharge device of claim 11, further comprising a regulating valve connected to a control unit for inputting closing or releasing instructions in accordance with control signals from the control unit for driving or terminating the liquid discharge means.

14. The liquid-drop discharge device of claim 1, further comprising a regulating value provided on the differential regulating tube or in the liquid reservoir for maintaining the internal pressure P2 of the liquid reservoir at a specified pressure value or at a valve exceeding the specified pressure value.

15. The liquid-drop discharge device of claim 14, further comprising a control unit connected to the regulating valve for inputting closing or releasing instructions in accordance with control signals from the control unit for driving or terminating the liquid discharge means.

16. The liquid-drop discharge device of claim 1, further comprising a regulating valve connected to a control unit for inputting closing or releasing instructions in accordance with control signals from the control unit for driving or terminating the liquid discharge means.

* * * * *